Patented Aug. 12, 1941

2,252,318

UNITED STATES PATENT OFFICE 2,252,318

RUBBER COMPOUNDING AND VULCANIZATION AND RESULTING VULCANIZATES

James H. Gravell, Elkins Park, Pa.; E. Hoy Rishel, executor of James H. Gravell, deceased, assignor to American Chemical Paint Company, a corporation of Delaware No Drawing. Application January 21, 1937, Serial No. 121,566

13 Claims. (Cl. 260—779)

The present invention relates to the compounding and vulcanization of rubber as well as to the resulting rubber vulcanizates.

The primary object of the invention is to produce a vulcanized rubber article or vulcanizate which is of superior quality with respect to resistance to deterioration with age, particularly with respect to deterioration resulting from the effects of heat, oxygen and light.

Another object of the invention is to provide an improved accelerator and antioxidant which can be employed without the production of undesired materials or end products in the finished article.

A further object is the provision of a rubber compound containing an antioxidant together with an accelerator of such character that the antioxidant will have full effect in the resulting vulcanizate.

It is also an object of the invention to lessen the cost of manufacture by employing a relatively inexpensive antioxidant which, at the same time, is substantially equivalent to the more expensive antioxidants in efficiency and effectiveness.

As will be demonstrated by the tabular results of certain experimental data given hereinafter, I have found that the addition of comparatively large quantities of arsenious compounds to ordinary rubber-sulphur mixes will act both as an accelerator of vulcanization and as an antioxidant and that even small amounts of such arsenious compounds will exert a powerful accelerating effect, although the resulting vulcanizates are not of particularly good character. As the arsenious compound is increased in amount relative to the sulphur, the accelerating effect remains while the antioxidant effect is markedly increased.

The arsenious compounds which I have found to be effective for the purposes of the present invention are those of trivalent arsenic which are not too volatile at the temperature employed in the subsequent vulcanization, such, for example, as arsenious oxide (white oxide), sodium arsenite, zinc arsenite, aniline arsenite and arsenious bromide.

I have further discovered that the addition of one or more of such arsenious compounds to a rubber-sulphur mix which also contains zinc oxide, zinc stearate or other more or less rubber soluble zinc compound which is effective in retarding the reaction of arsenious oxide with sulphur and which mix also contains an organic accelerator of vulcanization chosen from certain classes to be discussed below, will result in the production of a vulcanizate having markedly increased age resisting properties. Furthermore, my experiments indicate that this improvement is quite independent of the relative amounts of arsenious compound and zinc compound present in the mix within very wide limits and seems to depend on the peculiar property which the zinc compounds have in preventing reaction of the arsenious compound with sulphur during vulcanization. From this it is obvious, of course, that the arsenious compound employed must be some compound other than a sulfide.

Where an arsenious compound is added to a rubber-sulphur mix in the absence of a zinc compound and/or an organic accelerator, I have found that the resulting vulcanizates all had a characteristic yellow color indicating the formation of arsenic sulfide. By way of example, to a mix containing smoked sheets 100 parts and sulphur 3 parts, were added, in successive batches, ½, 3, 5, 10, 20, 30 and 50 parts of white arsenic (arsenious oxide) on a rubber mill. After vulcanization all of the batches produced vulcanizates of a yellow color and those with less than 10 parts of arsenious oxide aged poorly, although the others aged fairly well. In all instances, however, the presence of the arsenious oxide acted as a very powerful accelerator of vulcanization.

In view of the foregoing, therefore, my preferred composition includes a zinc compound such as zinc oxide, and I have discovered that the presence, in such a mix, of an arsenious compound equivalent to as little as one-half of one percent of arsenious oxide on the rubber content of the mix is generally sufficient to produce excellent age resistance in the resulting vulcanizate, although the equivalent of as much as 10% of the arsenious oxide on the rubber may be present without doing harm.

I have further discovered that the antioxidant effect of the arsenious compound is most evident when the rubber mix also contains an organic accelerator chosen from the class which includes the guanidines and substituted thiocarbamic acid.

Among accelerators with which the antioxidant effect of arsenious compounds is found to be very strong are diphenylguanidine, diorthotolylguanidine, tetramethylthiuram disulfide and tetramethylthiuram monosulfide. With other accelerators the antioxidant effect is weak or lacking. However, when more than one organic accelerator is used the presence of an accelerator from the above class brings out the antioxidant effect of the arsenious compound.

As a probable explanation of the effect of a zinc compound such as zinc oxide in making possible the production of oxidation resistant vulcanizates by means of small amounts of an arsenious compound, I wish to point out that in the absence of a zinc compound, the arsenious compound evidently reacts during vulcanization with the sulphur of the mix to form arsenious sulfide which is incapable of acting as an antioxidant. However, when a zinc compound such, for example, as zinc oxide is present along with the arsenious compound, the conversion of the arsenious compound to a sulfide is prevented. This theory is substantiated by the fact that in the absence of the zinc compound, vulcanizates containing an arsenious compound are yellow in color, while in the presence of the zinc compound they are not yellow, and also by the fact that when arsenious oxide is heated with sulphur a reaction takes place which forms yellow arsenious sulfide while in the presence of zinc oxide no yellow sulfide is formed.

As an illustration of the improvement obtained by the use of the composition of my invention in the preparation of a so-called "pure gum" vulcanizate as contrasted with a vulcanizate which does not contain them, I wish to set forth in tabular form the results of certain experimental work.

The following mixtures in parts by weight were prepared on a rubber mill in the manner familiar to this art:

Table I

|  | Mixtures | | |
|---|---|---|---|
|  | A | B | C |
| Smoked sheets | 100 | 100 | 100 |
| Sulfur | 3 | 3 | 3 |
| Zinc oxide | 10 | 10 | 10 |
| Diphenylguanidine | 1 | 1 | 1 |
| Stearic acid | 1 | 1 | 1 |
| Arsenic trioxide | 0 | 1 | 0 |
| Sodium arsenite | 0 | 0 | 1 |

Samples of each mixture were vulcanized at 289° F. for 20, 30, 40, 50 and 60 minutes.

The modulus at 500% elongation in lbs./sq. in., M, the tensile strength in lbs./sq. in. T, and the elongation at break in %, E were then determined.

A sample of each mix at each time of cure was then aged for 48 hours in a Bierer-Davis oxygen bomb, at a pressure of 300 lbs./sq. in. of oxygen, and a temperature of 70° C. After aging the samples were tested in the same way as the unaged samples.

The results of these tests are shown in the following table, in which the modulus, tensile strength, etc., as determined before aging are indicated by the subscript zero and the corresponding values after aging by the subscript "a".

Table II

| Time of cure, minutes | $M_0$ | $M_a$ | $T_0$ | $T_a$ | $E_0$ | $E_a$ |
|---|---|---|---|---|---|---|
| MIXTURE A | | | | | | |
| 20 | 362 | | 2,920 | 712 | 850 | 850 |
| 30 | 409 | Not determined | 2,765 | 1,080 | 822 | 850 |
| 40 | 603 | | 3,625 | 1,260 | 780 | 750 |
| 50 | 671 | | 3,580 | 575 | 755 | 500 |
| 60 | 732 | | 3,705 | 537 | 740 | 300 |
| MIXTURE B | | | | | | |
| 20 | 454 | | 3,010 | 2,250 | 815 | 950 |
| 30 | 460 | Not determined | 3,400 | 2,140 | 825 | 900 |
| 40 | 565 | | 3,690 | 2,410 | 805 | 900 |
| 50 | 626 | | 3,130 | 1,860 | 760 | 750 |
| 60 | 615 | | 3,465 | 1,715 | 775 | 750 |
| MIXTURE C | | | | | | |
| 20 | 705 | | 3,775 | 1,910 | 767 | 800 |
| 30 | 760 | Not determined | 3,570 | 1,950 | 745 | 800 |
| 40 | 822 | | 3,560 | 1,670 | 730 | 750 |
| 50 | 842 | | 3,470 | 1,240 | 725 | 700 |
| 60 | 845 | | 3,950 | 316 | 740 | 325 |

The foregoing results demonstrate that both the arsenious oxide and the sodium arsenite have markedly improved the resistance of the mixture to oxidation.

Another series of pure gum mixes was prepared similar to those given in Table I, but containing no stearic acid. These are shown in Table III and samples of each were treated exactly as were those of Table I. The results of the tests of the vulcanizates before and after aging are given in Table IV below, the symbols used having the same meaning as before:

Table III

|  | Mixture | | |
|---|---|---|---|
|  | D | E | F |
| Smoked sheets | 100 | 100 | 100 |
| Sulfur | 3 | 3 | 3 |
| Zinc oxide | 10 | 10 | 10 |
| Diphenylguanidine | 1 | 1 | 1 |
| Arsenic trioxide | 0 | 1 | 0 |
| Sodium arsenite | 0 | 0 | 1 |

Table IV

| Time of cure, minutes | $M_0$ | $T_0$ | $T_a$ | $E_0$ | $E_a$ |
|---|---|---|---|---|---|
| MIXTURE D | | | | | |
| 20 | 499 | 3,445 | 1,470 | 817 | 900 |
| 30 | 510 | 3,160 | 988 | 783 | 850 |
| 40 | 772 | 3,730 | 532 | 730 | 450 |
| 50 | 820 | 4,025 | 494 | 735 | 200 |
| 60 | 923 | 4,460 | Melted | 707 | Melted |
| MIXTURE E | | | | | |
| 20 | 624 | 3,605 | 1,370 | 785 | 750 |
| 30 | 630 | 3,130 | 1,920 | 760 | 850 |
| 40 | 771 | 3,370 | 1,755 | 735 | 725 |
| 50 | 761 | 3,480 | 1,055 | 750 | 600 |
| 60 | 739 | 3,290 | Melted | 745 | Melted |
| MIXTURE F | | | | | |
| 20 | 764 | 3,995 | 1,510 | 768 | 700 |
| 30 | 820 | 3,430 | 1,550 | 727 | 675 |
| 40 | 1,007 | 3,400 | 427 | 700 | 300 |
| 50 | 947 | 3,550 | 394 | 717 | 275 |
| 60 | 877 | 3,355 | Melted | 717 | Melted |

Again it will be seen that the addition of the arsenic compounds has improved the aging properties of the vulcanizates, and comparison of Tables II and IV will show that the presence of stearic acid somewhat improves the antioxidant effect of the arsenious compound. This is probably accounted for by the improved solubility of the zinc oxide in the rubber due to the presence of the stearic acid.

My invention is also useful in improving the aging properties of a rubber compound extended with whiting, as will be seen upon analysis of the experimental data given below.

The following mixtures were prepared:

Table V

|  | Compound | | | | | | |
|---|---|---|---|---|---|---|---|
|  | G | H | I | J | K | L | M |
| Smoked sheets | 100 | 100 | 100 | 100 | 100 | 100 | 100 |
| Whiting | 100 | 100 | 100 | 100 | 100 | 100 | 100 |
| Stearic acid | 1 | 1 | 1 | 1 | 1 | 1 | 1 |
| Zinc oxide | 10 | 10 | 10 | 10 | 10 | 10 | 10 |
| Sulfur | 3 | 3 | 3 | 3 | 3 | 3 | 3 |
| Diphenylguanidine | 1 | 1 | 1 | 1 | 1 | 1 | 1 |
| White arsenic | 0 | ½ | 1 | 2 | 3 | 5 | 10 |

The foregoing mixtures were cured in a platen press at 40 lbs. steam pressure for 30 minutes, and samples of each mixture were aged for 72 hours in the Bierer-Davis oxygen bomb at 300 lbs. per sq. in. oxygen pressure and at a temperature of 70° C.

The physical properties of the resulting vulcanizates, before and after aging, are given in Table VI below, the symbols again having the same meanings as in Tables II and IV.

*Table VI*

| Compound | $M_0$ | $M_a$ | $T_0$ | $T_a$ | $E_0$ | $E_a$ |
|---|---|---|---|---|---|---|
| G | 353 | ------ | 2,162 | 286 | 627 | 150 |
| H | 328 | 310 | 1,980 | 1,480 | 635 | 640 |
| I | 350 | 337 | 2,005 | 1,540 | 630 | 640 |
| J | 343 | 356 | 2,103 | 1,410 | 650 | 620 |
| K | 366 | 360 | 2,070 | 1,462 | 627 | 610 |
| L | 358 | 364 | 2,080 | 1,438 | 640 | 610 |
| M | 353 | *382 | 2,000 | *1,855 | 630 | *625 |

*After 24 hours in bomb.

Analysis of the foregoing tables will show that the white arsenic has improved the aging properties of the vulcanizate in each instance, and further that the effect seems practically uniform with quantities of arsenious oxide over a range extending from one-half to 10 parts per 100 parts of rubber.

An example of the effect of the use of large quantities of arsenic trioxide in a compound is given below.

*Table VII*

| | Compound No. | |
|---|---|---|
| | 100A | 100B |
| Smoked sheets | 100 | 100 |
| Sulfur | 3 | 3 |
| Stearic acid | 1 | 1 |
| Zinc oxide | 10 | 10 |
| Diphenylguanidine | 1½ | 1½ |
| Whiting | 200 | 100 |
| White arsenic | 0 | 138 |

138 parts of white arsenic has approximately the same volume as the extra 100 parts of whiting in compound 100A.

These samples were cured at 60 lbs. steam pressure for 15 and 30 minutes. Samples of each were aged in the oxygen bomb under standard conditions for 48 hours.

Both samples of 100A were deteriorated after aging beyond the possibility of testing them. Both samples of 100B were well preserved at the end of the testing period.

Before testing, sample 100B seemed considerably overcured while sample 100A was not overcured. Here the arsenic has exerted a powerful accelerating effect as well as an antioxidant effect. Sample 100B had acquired a yellow color during vulcanization not evident in any of the examples given previously. This is due to the presence therein of arsenic sulfide.

In connection with the effect of arsenious compounds in a rubber mix in the presence of varying quantities of a zinc compound, attention is directed to the following tabulations of certain experimental data in connection with which, as already indicated, I have found that when quantities of arsenic not too greatly in excess of the zinc are present in a rubber mix, no yellow color develops on curing, while the total omission of a zinc compound from a mix containing arsenic gives a yellow vulcanizate of poor aging properties. Furthermore, I have found that in the presence of sufficient zinc compound to prevent the formation of arsenic sulfide with its consequent yellow color in the resulting vulcanizate, the arsenious compound exerts no secondary accelerating effect but only a strong antioxidant effect.

The compounds of Table VIII were prepared in the usual manner:

*Table VIII*

| | Compound No. | | | | | | | |
|---|---|---|---|---|---|---|---|---|
| | 11 | 13 | 15 | 110 | 51 | 53 | 55 | 510 |
| Smoked sheets | 100 | 100 | 100 | 100 | 100 | 100 | 100 | 100 |
| Sulfur | 3 | 3 | 3 | 3 | 3 | 3 | 3 | 3 |
| Diphenylguanidine | 1 | 1 | 1 | 1 | 1 | 1 | 1 | 1 |
| Stearic acid | 1 | 1 | 1 | 1 | 1 | 1 | 1 | 1 |
| White arsenic | 1 | 1 | 1 | 1 | 5 | 5 | 5 | 5 |
| Zinc oxide | 1 | 3 | 5 | 10 | 1 | 3 | 5 | 10 |

Duplicate samples of each of the above mixes were cured in a platen press at 40 lbs. steam pressure for 20, 30, 40 and 50 minutes.

The tensile strength and elongation at break were determined for each mix at each cure on unaged samples and on samples aged for 72 hours in the oxygen bomb.

The results are given in Table IX below:

*Table IX*

| Time of cure, minutes | Sample No. | | | | | | | |
|---|---|---|---|---|---|---|---|---|
| | 11 | | 13 | | 15 | | 110 | |
| | T | E | T | E | T | E | T | E |
| BEFORE AGING | | | | | | | | |
| 20 | 2,410 | 775 | 2,600 | 775 | 2,630 | 775 | 2,830 | 775 |
| 30 | 2,570 | 750 | 2,780 | 750 | 3,005 | 750 | 2,720 | 750 |
| 40 | 2,790 | 775 | 2,880 | 750 | 2,860 | 750 | 2,690 | 725 |
| 50 | 2,480 | 700 | 2,700 | 700 | 3,260 | 725 | 3,190 | 725 |
| AFTER AGING 72 HOURS IN O₂ BOMB | | | | | | | | |
| 20 | 478 | 750 | 712 | 800 | 1,070 | 800 | 1,120 | 800 |
| 30 | 615 | 700 | 1,140 | 750 | 1,742 | 775 | 1,570 | 825 |
| 40 | 340 | 500 | 368 | 450 | 1,750 | 750 | 1,680 | 725 |
| 50 | ------ | ------ | 286 | 400 | 1,850 | 775 | 1,730 | 700 |

| Time of cure, minutes | Sample No. | | | | | | | |
|---|---|---|---|---|---|---|---|---|
| | 51 | | 53 | | 55 | | 510 | |
| | T | E | T | E | T | E | T | E |
| BEFORE AGING | | | | | | | | |
| 20 | 3,260 | 800 | 2,960 | 775 | 2,800 | 750 | 2,570 | 750 |
| 30 | 2,790 | 775 | 2,250 | 725 | 2,850 | 750 | 2,150 | 825 |
| 40 | ------ | ------ | ------ | ------ | 2,560 | 725 | 2,750 | 700 |
| 50 | 2,470 | 750 | 2,970 | 750 | 3,090 | 725 | 3,180 | 750 |
| AFTER AGING 72 HOURS IN O₂ BOMB | | | | | | | | |
| 20 | 635 | 700 | 780 | 775 | 668 | 775 | 833 | 750 |
| 30 | 347 | 575 | 675 | 700 | 875 | 750 | 1,080 | 800 |
| 40 | ------ | ------ | ------ | ------ | 590 | 575 | ------ | 600 |
| 50 | ------ | ------ | 778 | 500 | 758 | 575 | 1,390 | 700 |

It will be noted that in the compounds containing 1% of arsenic oxide on the rubber, the antioxidant effect of the arsenious oxide was increased by increasing amounts of zinc oxide up to 5% of the rubber. No further improvement was noted up to 10% zinc oxide on the rubber. In the compounds containing 5% arsenious oxide on the rubber, increasing the zinc oxide improved the aging properties of the vulcanizate, up to at least 10% zinc oxide on the rubber.

Many further illustrations might be given of the beneficial effect of arsenious compounds in various rubber mixes, but it is believed that the foregoing will serve by way of illustration. I should also like to state that the invention is applicable to materials similar to rubber, such, for example, as balata and gutta-percha as well as hevea rubber obtained in any of the usual forms, such as smoked sheets, crepe, etc.

The antioxidant effect of my preferred agents which are relatively inexpensive and readily available, compares very favorably with that produced by commercial organic antioxidants of very much higher price, such, for example, as Flectol H which is a ketone-amine reaction product and one of the most efficient commercially available antioxidants. By way of example, Tables X and XI below give a comparison of the effectiveness of ordinary white arsenic in a rubber mix with that of Flectol H.

The following mixes were prepared on a mill as usual; and cured at 40 lbs. steam pressure for 30 minutes.

Table X

|  | Compound | | | | |
|---|---|---|---|---|---|
|  | 10 | 10A | 10B | 10C | 10D |
| Smoked sheets | 100 | 100 | 100 | 100 | 100 |
| Whiting | 100 | 100 | 100 | 100 | 100 |
| Stearic acid | 1 | 1 | 1 | 1 | 1 |
| Zinc oxide | 10 | 10 | 10 | 10 | 10 |
| Sulfur | 3 | 3 | 3 | 3 | 3 |
| Diphenylguanidine | 1 | 1 | 1 | 1 | 1 |
| White arsenic | 0 | ½ | 1 | 0 | 0 |
| Flectol H | 0 | 0 | 0 | ½ | 1 |

The physical properties, before and after aging for 24 hours in the oxygen bomb, are given in Table XI below:

Table XI

| Compound | $M_0$ | $M_a$ | $T_0$ | $T_a$ | $E_0$ | $E_a$ |
|---|---|---|---|---|---|---|
| 10 | 420 | 246 | 2,380 | 316 | 620 | 417 |
| 10A | 370 | 335 | 2,155 | 1,625 | 625 | 615 |
| 10B | 367 | 353 | 2,090 | 1,650 | 625 | 612 |
| 10C | 402 | 341 | 2,335 | 1,625 | 617 | 620 |
| 10D | 371 | 333 | 2,187 | 1,552 | 612 | 605 |

The foregoing tables clearly demonstrate that white arsenic compares very favorably with Flectol H as an antioxidant.

That the anti-oxidant effect of arsenic and zinc oxide in the presence of other accelerators than di-phenylguanidine is very marked is substantiated by the following tables representing the results of certain experimental work in this connection. The symbols have a signification as in the previous examples.

Table XII

|  | Compound | |
|---|---|---|
|  | 15 | 15A |
| Smoked sheets | 100 | 100 |
| Whiting | 100 | 100 |
| Stearic acid | 1 | 1 |
| Zinc oxide | 10 | 10 |
| Sulfur | 3 | 3 |
| Diorthotolylguanidine | 1½ | 1½ |
| White arsenic | 0 | ½ |

Cure: 30 minutes at 40 lbs. steam pressure.
Aging: 24 hours in Bierer-Davis oxygen bomb.

| Compound | $M_0$ | $M_a$ | $T_0$ | $T_a$ | $E_0$ | $E_a$ |
|---|---|---|---|---|---|---|
| 15 | 415 | 441 | 2,032 | 1,150 | 587 | 523 |
| 15-A | 393 | 429 | 2,065 | 1,635 | 600 | 568 |

Table XIII

|  | Compound | |
|---|---|---|
|  | 18 | 18-A |
| Smoked sheets | 100 | 100 |
| Whiting | 100 | 100 |
| Stearic acid | 1 | 1 |
| Zinc oxide | 10 | 10 |
| Sulphur | 3 | 3 |
| Tetramethylthiuram disulfide | ³⁄₁₀ | ³⁄₁₀ |
| White arsenic | 0 | ½ |

Cured in press at 40 lbs. steam pressure for 30 minutes.
Aged 96 hours in oxygen bomb.

| Compound | $M_0$ | $M_a$ | $T_0$ | $T_a$ | $E_0$ | $E_a$ |
|---|---|---|---|---|---|---|
| 18 | 237 | * | 1,640 | * | 690 | * |
| 18-A | 237 | 247 | 1,657 | 384 | 720 | 495 |

* Completely deteriorated.

Table XIV

|  | Compound | |
|---|---|---|
|  | 5 | 5-A |
| Smoked sheets | 100 | 100 |
| Whiting | 100 | 100 |
| Stearic acid | 1 | 1 |
| Zinc oxide | 10 | 10 |
| Sulphur | 3 | 3 |
| Tetramethylthiuram monosulfide | ½ | ½ |
| White arsenic | 0 | ½ |

Cure: 30 minutes at 40 lbs. steam pressure.
Aging: 96 hours in oxygen bomb.

*Compounds after aging*

5—Completely deteriorated.
5-A—Well preserved.

In the foregoing disclosure the term "rubber" is used in its general sense to include caoutchouc, balata, gutta-percha, rubber isomers, rubber-like substances, natural or synthetic, or similar substances subject to static oxidation and whether or not mixed with fillers, pigments, etc.

It should also be understood that any sulphur bearing material capable of supplying sulphur in a form suitable for vulcanization may be substituted for plain sulphur in a manner well understood in this art, and that selenium and tellurium may likewise be substituted for sulphur. The term "sulphur," therefore, as used in the present disclosure and in the appended claims, is intended to be interpreted as including such well known equivalents.

Any arsenite may be substituted for white arsenic or sodium arsenite and any zinc compound may be used which is capable of retarding the formation of arsenic sulfide during vulcanization.

The arsenious compound may be incorporated in the rubber batch in any convenient way. It may, for instance, be added to the mixture with other powders and fillers during the mixing operation or it may be added to latex in the form of a solution or paste and precipitated together with the rubber on coagulation of the latex, etc.

The preferred composition contains from ½ to 10% of arsenious oxide or its equivalent on the rubber content, and zinc oxide or its equivalent from 5 to 10% on the rubber content.

It will be noted that certain of the foregoing tables disclose some irregularities in results, but this does not affect the conclusions to be drawn therefrom because general trends rather than individual values are of chief importance in experimental work of this kind. In this connection it must be recalled that rubber is noticeably sensitive to the amount of milling which it receives as well as to the temperatures attained during milling and, for physical reasons, it is not possible to treat each mixture in exactly the same way on the mill. Individual samples, therefore, will vary a little in their properties in spite of every precaution.

Furthermore, rubber ages best at an optimum cure but it is scarcely ever possible to cure articles constantly exactly to the optimum degree and variations in the cure will often produce irregularities in tabulated results without, however, indicating any vital discrepancy in the general trend. For example, the 60-minute cure of Mixture C in Table II is obviously overcured and, no doubt, it has cured a little more rapidly than the other mixtures, probably because of the sodium oxide present in the sodium arsenite which sometimes has a slight accelerating effect. It will be noticed that the 60-minute cure referred to is considerably stiffer than the other compounds as shown partly by the initial modulus. Also, in Table IV, the 20-minute cure of Mixture E is somewhat undercured while the 40 and 50 minute cures of Mixture F are overcured. Again this is shown by the very high initial modulus.

I claim:

1. A rubber-sulphur composition for use in producing vulcanized rubber articles, said composition containing a compound of trivalent arsenic chosen from the class consisting of arsenious oxide, sodium arsenite, zinc arsenite, aniline arsenite and arsenious bromide, and a zinc compound chosen from the class consisting of zinc oxide and zinc stearate.

2. A rubber-sulphur composition for use in producing vulcanized rubber articles, said composition containing a compound of trivalent arsenic chosen from the class consisting of arsenious oxide, sodium arsenite, zinc arsenite, aniline arsenite and arsenious bromide, the arsenious compound being present in an amount from about .5% to about 10% of the rubber content, and a zinc compound chosen from the class consisting of zinc oxide and zinc stearate.

3. A rubber-sulphur composition for use in producing vulcanized rubber articles, said composition containing a compound of trivalent arsenic chosen from the class consisting of arsenious oxide, sodium arsenite, zinc arsenite, aniline arsenite and arsenious bromide, a zinc compound chosen from the class consisting of zinc oxide and zinc stearate, and an organic accelerator chosen from the class consisting of guanidines and substituted thiocarbamic acids.

4. A composition in accordance with claim 1 and further including a guanidine.

5. A rubber-sulphur composition for use in producing vulcanized rubber articles, said composition containing arsenious oxide, and a zinc compound chosen from the class consisting of zinc oxide and zinc stearate.

6. A composition in accordance with claim 5 and further including an organic accelerator chosen from the class consisting of guanidines and substituted thiocarbamic acids.

7. A rubber-sulphur composition containing arsenious oxide and zinc oxide.

8. A rubber-sulphur composition for use in producing vulcanized rubber articles, said composition containing sodium arsenite, and a zinc compound chosen from the class consisting of zinc oxide and zinc stearate.

9. A composition in accordance with claim 8 and further including an organic accelerator chosen from the class consisting of guanidines and substituted thiocarbamic acids.

10. A rubber-sulphur composition containing sodium arsenite and zinc oxide.

11. As a new article of manufacture, a rubber product produced by the vulcanization of the composition of claim 1.

12. As a new article of manufacture, a rubber product produced by the vulcanization of the composition of claim 2.

13. As a new article of manufacture, a rubber product produced by the vulcanization of the composition of claim 3.

JAMES H. GRAVELL.